United States Patent
Yin et al.

(10) Patent No.: US 12,032,510 B1
(45) Date of Patent: Jul. 9, 2024

(54) SELF-RECOVERY MECHANISM FOR MULTI-HOSTS AND MULTI-DEVICES EMULATION AND PROTOTYPING SYSTEM BUS

(71) Applicant: Synopsys, Inc., Mountain View, CA (US)

(72) Inventors: He Yin, Santa Clara, CA (US); Goichiro Ono, San Jose, CA (US); Zhe Zhao, Shanghai (CN); Yuchen Xu, San Jose, CA (US)

(73) Assignee: Synopsys, Inc., Sunnyvale, CA (US)

( * ) Notice: Subject to any disclaimer, the term of this patent is extended or adjusted under 35 U.S.C. 154(b) by 43 days.

(21) Appl. No.: 17/939,324

(22) Filed: Sep. 7, 2022

Related U.S. Application Data

(60) Provisional application No. 63/241,388, filed on Sep. 7, 2021.

(51) Int. Cl.
*G06F 13/42* (2006.01)
*G06F 3/06* (2006.01)

(52) U.S. Cl.
CPC ........ *G06F 13/4291* (2013.01); *G06F 3/0619* (2013.01); *G06F 3/0647* (2013.01); *G06F 3/067* (2013.01)

(58) Field of Classification Search
CPC .......................... G06F 30/331; H04J 3/0685
See application file for complete search history.

(56) References Cited

U.S. PATENT DOCUMENTS

| | | | | |
|---|---|---|---|---|
| 11,841,813 B2* | 12/2023 | Ko | ......................... | G06F 13/366 |
| 2008/0089363 A1* | 4/2008 | Paulitsch | .............. | H04J 3/0685 |
| | | | | 370/503 |
| 2013/0035925 A1* | 2/2013 | Chang | ................... | G06F 30/331 |
| | | | | 703/28 |
| 2021/0194473 A1* | 6/2021 | Shin | ......................... | G06F 1/06 |
| 2022/0385280 A1* | 12/2022 | Gizdarski | ............. | G04F 10/005 |

\* cited by examiner

*Primary Examiner* — Getente A Yimer
(74) *Attorney, Agent, or Firm* — Fenwick & West LLP

(57) ABSTRACT

A configuration to address a bus stall during data packet transmission also allows for bus recover due to data packet transmission errors. If a downstream node is not ready to receive data from a buffer of an upstream node, a timer counts a timeout value. The time count increments on each clock cycle in which the downstream node is not ready to receive data. The buffer is cleared at the upstream node when the count reaches a predetermined threshold value. Alternately, the configuration also operates to receive a packet header from an upstream node, the packet header identifying a number of data in a packet. If no data downstream is received on a clock cycle, a counter triggers and is incremented for each cycle in which no date is received. When a threshold is reached dummy data fills a data packet to then transmit the data.

20 Claims, 10 Drawing Sheets

US 12,032,510 B1

SELF-RECOVERY MECHANISM FOR MULTI-HOSTS AND MULTI-DEVICES EMULATION AND PROTOTYPING SYSTEM BUS

CROSS REFERENCE TO RELATED APPLICATIONS

This application claims a benefit of, and priority to, U.S. Patent Application No. 63/241,388, filed Sep. 7, 2021, the contents of which are incorporated by reference in its entirety.

TECHNICAL FIELD

The present disclosure generally relates to a circuit design emulation system. In particular, the present disclosure relates to a system and method for providing a self-recovery mechanism for a bus in a multi-host and multi-device emulation and prototyping system.

BACKGROUND

With growing complexity of circuit design and a requirement for more debug features, the demand for an emulation and prototyping system's capacity also increases. In order to share hardware resources, multiple customer designs may be running simultaneously on one emulation system. Therefore, in an emulation and prototyping system, multiple hosts and devices are usually installed on one system.

SUMMARY

In one embodiment, an emulation system includes a memory that stores instructions and a processor coupled with the memory. The processor executes the instructions to cause it to determine whether a downstream node is ready to receive data from a buffer of an upstream node. The upstream node is coupled to the downstream node in the emulation system. The processor executes the instructions to trigger a count as a timeout value for a counter of the upstream node in response to the downstream node not being ready to receive data. The processor executes the instructions to increment the count for the counter for each consecutive clock cycle in which the downstream node is not ready to receive data. The processor executes the instructions to issue a signal to clear the buffer at the upstream node when the counter is at least an output timeout threshold value for the upstream node.

In another embodiment, the processor executes instructions to receive at a downstream node a packet header from an upstream node, the packet header identifying a data size in a packet. The downstream node is coupled to the upstream node in an emulation system. The processor executes instructions to determine whether the data received is less than the data size specified by the packet header at the downstream node on a clock cycle. The processor executes instructions to trigger a counter in response to the data received being less than the data size specified by the packet header at the downstream node on the clock cycle. The processor executes instructions to increment a value for the counter in response to the data received being less than the data size specified by the packet header at the downstream node for each consecutive clock cycle. The processor executes instructions to insert dummy data into the packet to fill a data size of the packet when a value of the timer is at least an input timeout threshold value. The processor executes instructions to transmit the packet to the downstream node.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG.

DETAILED DESCRIPTION

Figure 1A:
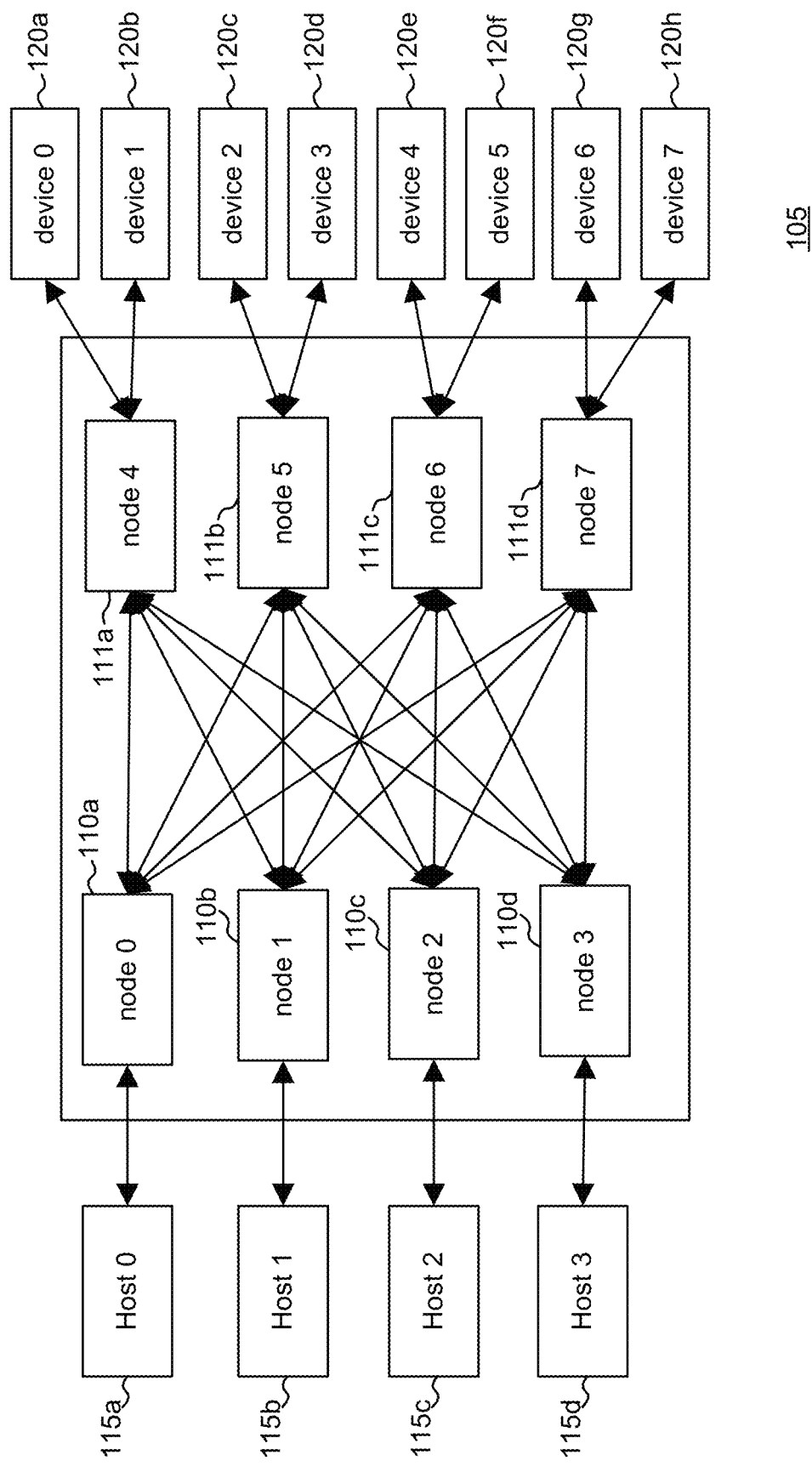
(FIG. 1A illustrates an example of emulation and prototyping system with multi-masters and multi-devices in accordance with one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Between systems having many hosts and devices, there are multi-level bus nodes and bus links with heavy traffic running thereon. Bus packet frame errors or bus stalling can be caused by many reasons, like bus driver malfunction, bus link errors or unstable cable connections. This may be worsened when one bus node or link error that occurs in one job causing errors in other running jobs that share a system bus, and such errors may propagate to other nodes and cause more damage, for example, causing more running jobs to fail.

One example embodiment includes a configuration (system, method and/or computer readable program instructions) for use in an emulation system having two or more bus nodes interconnected via a data communication pathway (or data bus or bus). In some embodiments, an emulation system may be a node and coupled with a second emulation system via a bus. The configuration allows recovery of a bus during data packet transmission when a bus is stalled beyond an expected period of time. Further, the configuration allows for repairing data packets having frame errors.

In one embodiment, a configuration determines whether a downstream node is ready to receive data from a buffer of an upstream node. The configuration triggers a count as a timeout value for a timer in response to the downstream node not being ready to receive data. The configuration increments the count for the timer for each consecutive clock cycle in which the downstream node is not ready to receive data. The configuration issues a signal to clear the buffer at the upstream node in response to the count meeting a predetermined threshold value, the threshold value determined by an output timeout value.

A disclosed configuration also allows for repair of data packets on a bus where frame errors are present. The configuration receives at a downstream node a packet header from an upstream node the packet header indicates the data size to be received for a packet. The configuration determines whether data received is less than the data size by the packet header at the downstream node on a clock cycle. The configuration triggers, in response to data received being less than the data size specified by the packet header at the downstream node on the clock cycle, a timer. The configuration increments a value for the timer in response to data received being less than the data size specified by the packet header at the downstream node for each consecutive clock cycle. The configuration inserts dummy data into the packet to fill the packet in response to the value of the timer meeting a predetermined timer value, the threshold value determined by an input timeout value. The configuration transmits the packet downstream.

Technical advantages of the present disclosure include recovery of a bus during data packet transmission when a bus is stalled for a period beyond what may be expected, e.g., a predetermined time, for a stall. Further, the configuration allows for repairing data packets having frame errors.

Figure 6:
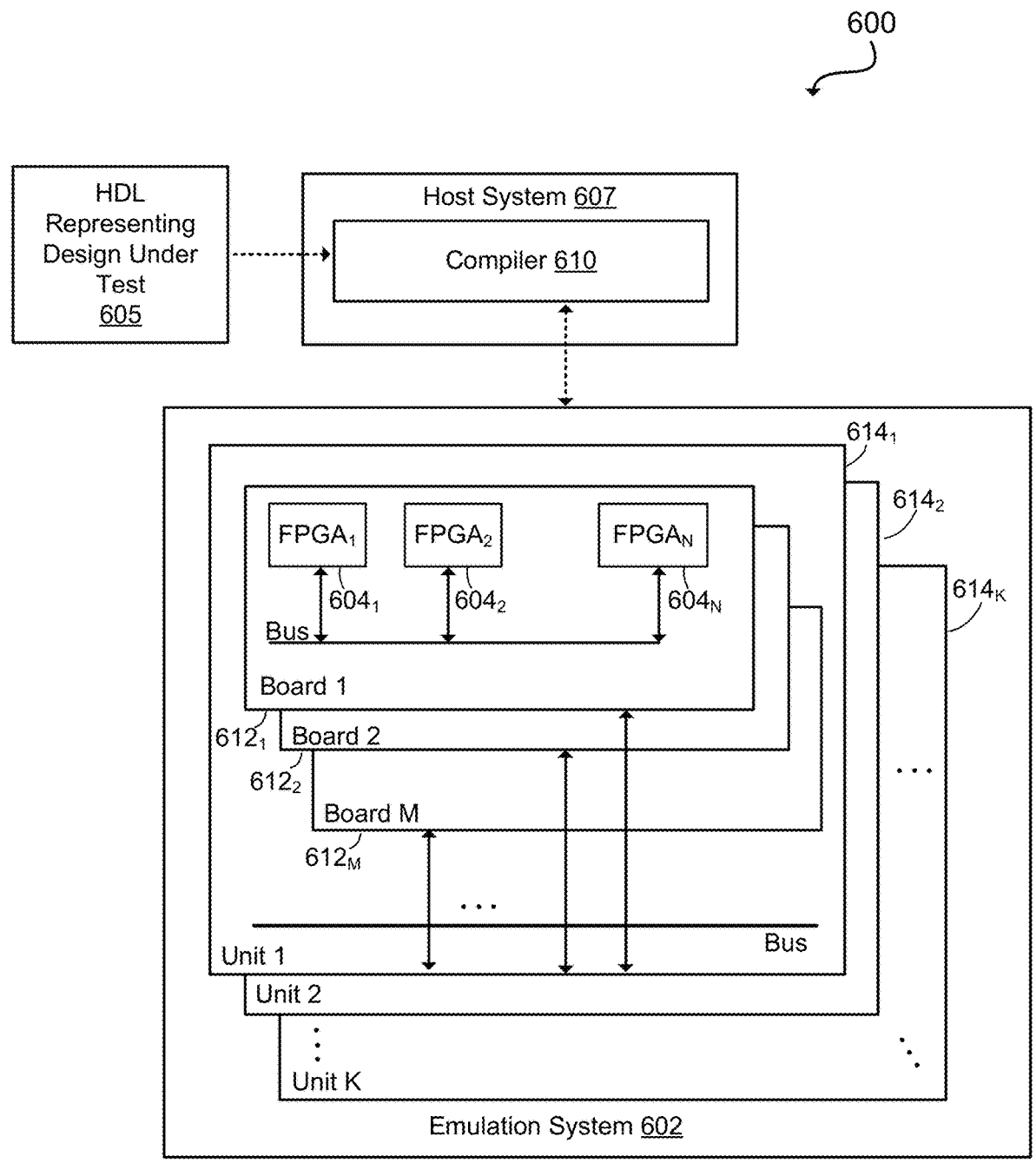
FIG. 6 depicts a diagram of an example emulation system in accordance with one embodiment.

FIG. (FIG. 1A illustrates an example of operation of an emulation and prototyping system 105 in accordance with one embodiment. The emulation and prototyping system 105 includes one or more hosts 115 and one or more devices 120. The host 115 includes a processing device (e.g., as described in FIG. 7) that executes instructions for performing emulation such as controlling the download of a circuit design onto the devices 120. The host 115 may be similar to the host system 607 as shown in FIG. 6. Each device 120 may be one or more field programmable gate arrays (FPGA) where a portion of the circuit design is downloaded into for performing emulation. Each device 120 may be similar to an FPGA 604 as shown in FIG. 6. The emulation and prototyping system 105 further includes two or more bus nodes 110, 111. Each bus node 110, 111 includes one or more FPGAs that implements firmware for controlling the devices 120. The bus nodes 110, 111 may be implemented on a board 612 as shown in FIG. 6. In one embodiment, there may be a first set of one bus nodes, e.g., node 0 110a to node 3 110d, and a second set of bus nodes, e.g., nodes 4 111a through node 7 111d. In this example, the first set of nodes 110, node 0 110a to node 3 110d, are communicatively coupled with each of the second set of nodes, e.g., node 4 111a to node 7 111d.

The emulation and prototyping system 105 includes one or more hosts 115, e.g., primary 0 115a through primary 3 115d. The primary 0 115a to primary 3 115d couple respectively with the first set of nodes, specifically, node 0 110a to node 3 110d. The emulation and prototyping system 105 further includes one or more devices 120, e.g., device 0 120a to device 120h. In the example, each of the second set of nodes 111, e.g., node 4 111a to node 7 111d, are coupled with two devices 120. For example, node 4 111a couples with device 0 120a and device 1 120b, node 5 111b couples with device 2 120c and device 3 120d, node 6 111c couples with device 4 120e and device 5 120f, and node 7 111d couples with device 6 120g and device 7 120h.

Two example operational cases may be described through FIG. 1. In a first example operational case (case 1), a job 0 is running on primary 0 115a using device 0 120a through bus node 0 110a and node 4 111a. Job 1 is running on primary 1 115b using device 1 120b through bus node 1 110b and node 4 111a. If job 0 causes errors on node 4 111a, both job 0 and job Twill have errors. If the errors are not resolved in time, errors on node 4 111a may propagate to upstream node 0 110a through node 3 110d, which results in additional errors that may include bus stalling or data errors during data transmission on more bus nodes.

In a second example operational case (case 2), job 0 may be running on primary 0 115a using device 0 120a through bus node 0 110a and node 4 111a. Job 1 is running on primary 0 115a using device 2 120c through bus node 0 110a and node 5 111b. If job 0 causes errors on node 0 110a, both job 0 and job 1 will have errors. If the errors are not revolved in time, the errors on node 0 110a may propagate to downstream nodes 4 111a through node 7 111b resulting in more errors.

Combinations of operational case 1 and operational case 2 may occur throughout the emulation and prototyping system 105. Thus, a self-recovery mechanism based on timeout is needed to avoid errors lasting beyond expected time and subsequently propagating to upstream nodes or downstream nodes. Also, a timeout threshold needs to be set carefully, otherwise it can cause a false alarm if the timeout threshold is too small, or it can bring unnecessary waiting time if the timeout threshold is too large.

Figure 1B:
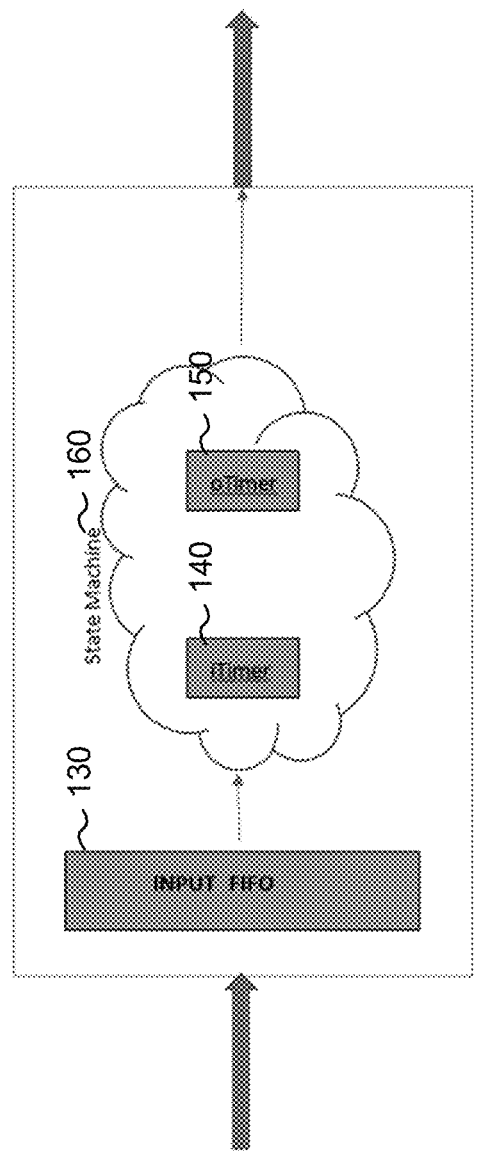
FIG. 1B illustrates an example bus node with a first in first out buffer coupled with a state machine in accordance with one embodiment.

In the disclosed configurations, a self-recovery mechanism based on timeout, provides an efficient method to repair bus packets with frame errors, recover a bus from stalling beyond expected time and assert timeout flags for quick error source identification. The present system limits the damage close to the error bus links or bus nodes and optimizes timeout threshold for each bus node. In this mechanism, every bus node has one input first in-first out (FIFO) buffer, one timer for input port(iTimer) and one timer for output ports (oTimer). FIG. 1B illustrates an example bus node with a FIFO buffer 130 coupled with a state machine 160. Within the state machine 160 is an iTimer 140 and an oTimer 150. The threshold of the FIFO buffer allows a least one full length data packet to be written into the FIFO buffer. Two parameters are defined in each bus node as well. The first parameter refers to an input timeout threshold time (ITO) that is defined in a unit of time and iTimer is hardware clock logic that uses a bus node clock period. The second parameter refers to an output timeout threshold time (OTO) that is defined in a unit of time and oTimer is hardware clock logic that uses a bus node clock period.

At the beginning of a packet transfer, if a target output port of a downstream node is stalled and not ready to receive data. A stall may be determined when no ready signal is received by the upstream node from the downstream node indicating to the upstream node it is ready to receive packets. If the downstream node is stalled, oTimer within an upstream node coupled to the downstream node starts to count. If oTimer reaches OTO divided by a clock period (T) of the bus node that is sending the data, an output timeout occurs. At this point, the output bus node issues a reset to its input FIFO until no more packet is coming and waits for an instruction interval. The output bus node resets its oTimer, returns to an idle state and asserts an output timeout flag. If the target output port becomes ready before oTimer reaches OTO divided by the clock period (T), oTimer will be reset, the output bus node will resume from current state and no timeout flag will be asserted. This configuration prevents the output bus node from stalling beyond expected time which is OTO.

Figure 2:
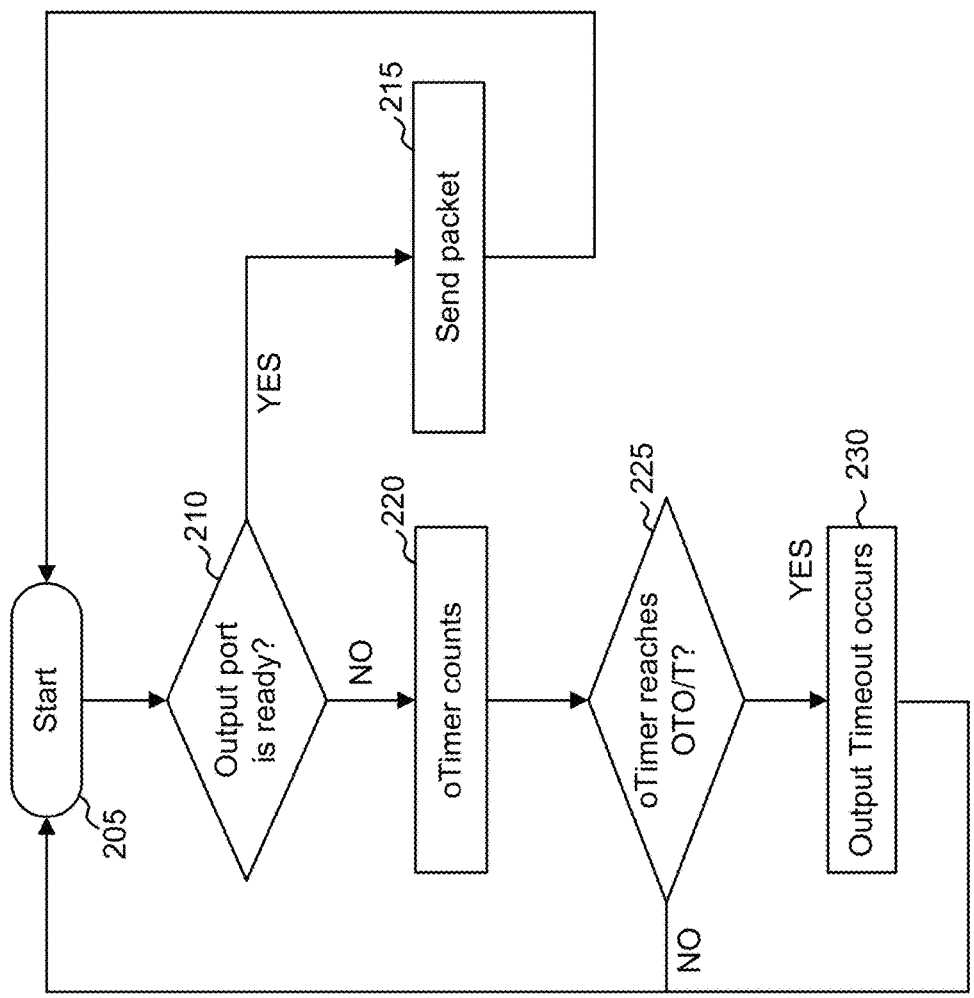
FIG. 2 illustrates an example output timeout process at the beginning of packet transfer for each bus node in accordance with one embodiment.

Referring now to FIG. 2, it illustrates an example output timeout process at the beginning of data packet transfer for each bus node in accordance with one embodiment. By way of example, in an emulation system, assume node 0 110*a* transmits (or sends) data packets to node 4 111*a*. At the start 205 of the process, the system determines whether a FIFO buffer in node 4 111*a* is ready to receive data at 210. By way of example, node 4 111*a* will indicate to node 0 that it is ready to receive data by transmitting a ready signal to node 0 110*a*. If the FIFO buffer in node 4 111*a* is ready, node 0 110*a* sends (or transmits) a data packet to node 4 111*a* at 215 and returns to receive data in the next clock cycle. If node 4 111*a* is not ready, node 0 110*a* starts (or triggers) 220 an oTimer counter count. Node 0 110*a* checks whether node 4 111*a* is ready to receive at a subsequent clock cycle, where every clock cycle is a count for oTimer. At each subsequent clock cycle, the process determines 225 whether oTimer reaches a threshold of OTO/T at 225. If OTO/T is not reached, the process returns to the start at 205 and determines whether the FIFO buffer in node 4 111*a* is ready at 210. If oTimer reaches the threshold of OTO/T, the output timeout occurs at 230 and node 0 110*a* issues a buffer clear for itself, which deletes the data stored in node 0 110*a*. Node 0 110*a* will wait for some time, e.g., software interrupt interval, to ensure a next instruction is a new instruction by waiting for a predetermined time period for such instruction. The process returns to start 205. Output timeout only checks when a node wants to send a packet header out (e.g., from node 0 110*a* to node 4 111*a*). The input FIFO buffer of each bus node is set to an almost full threshold to guarantee that a least one full length data packet can be written into.

Figure 3:
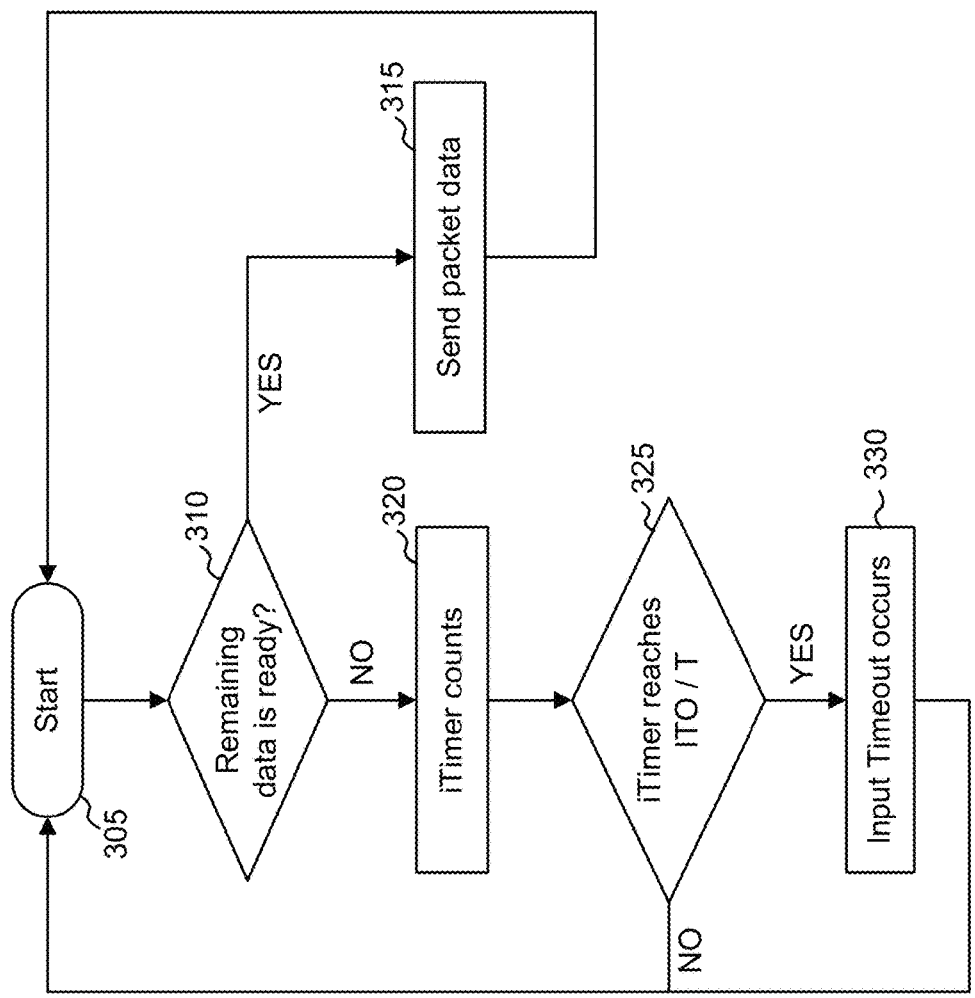
FIG. 3 illustrates an example input timeout process in the middle of packet transfer for each bus node in accordance with one embodiment.

FIG. 3 illustrates an example input timeout process in the middle of packet transfer for each bus node in accordance with one embodiment. In this example too, node 0 110*a* is transmitting data packets to node 4 111*a*. The data packet from node 0 110*a* includes a packet header that indicates a data size (e.g., bytes) that should be received by node 0 111*a* based on what is transmitted from node 0 110*a*. Accordingly, as data is received, node 4 111*a* determines whether all the data of a data packet has been received at 310. Data should be received on every bus clock cycle, and if all the data has been received by node 4 111*a*, the next data in a data packet is sent at 315. If, however, the data received by node 4 111*a* on a clock cycle is not fully received, i.e., the data received is less than the data size specified by the packet header, an iTimer counter, starts (or triggers) and begins to count at 320. The process determines whether iTimer has reached ITO/T at 325. If data is received before iTimer reaches ITO/T, iTimer resets and returns to start 305 to determine whether data is ready to be received on the next clock cycle.

If it is determined that data is not fully received within the clock cycle at 310, the counter (iTimer) increments the iTimer count at 320. If the time ITO/T again is not reached, the process returns to start 305. If the process determines that the ITO/T threshold of iTimer is reached at 325, an input timeout occurs at 330. With an input timeout, node 4 111*a* injects dummy data into the data packet until the data size matches with what the data packet header specifies. This creates full data packet downstream with dummy data. Dummy data has signatures that the software can use to see that there may have been an error in transmission along the bus. Thereafter iTimer is reset, an input timeout flag is set, and may return to start 305, which may be an idle state. In this way, packet with frame errors can be repaired. Input timeout only checks during the transmission of a data packet after a data packet header has been received (e.g., from node 0 110*a* to node 4 111*a*)

It is noted that in setting ITO and OTO, if the threshold values are too small, it may cause false alarm. If the threshold values are too large, it can cause unnecessary waiting time. Having an input and output timeout mechanism for interconnected bus nodes, provides a timeout and self-recovery chain for the whole system.

To avoid (or prevent) bus stalling and output timeout propagating to upstream, OTO may be designed so that the closer bus node locates to a destination node, e.g., device under test, the faster it goes to output timeout. An upstream OTO is calculated based on its downstream OTO to optimize threshold value. Once a bus node goes to output timeout and resets its input FIFO buffer, its upstream bus nodes can continue moving data, and their oTimer may be reset before they go to output timeout. In this way, upstream bus nodes can resume to work without any damage as FIFO buffers do not need to be reset.

OTO may be determined as follows:

$$OTO(X) = \max\ OTO(Y_0)*\text{NFANIN}(Y_0) + \text{LDELAY}(X, Y_0), \ldots, OTO(Y_n)*\text{NFANIN}(Y_n) + \text{LDELAY}(X, Y_n) + \text{OMARGIN}(X)$$

where X is an upstream node, $Y_n$ is a downstream node, n is a node number, NFANIN is a number of fan-ins, LDELAY is a worst bus link delay (pipeline delay and flow control turnaround delay), and OMARGIN is an output timeout threshold margin (e.g., inaccurate propagation delay, clock asynchrony, etc.). LDELAY and OMARGIN may be set to a predetermined value. For OTO, the present system determines an OTO value from the downstream (device 120 side) and move upstream towards the host 115. Further, the present system determines a baseline OTO value (in time) for downstream nodes directly connected to the device 120. The baseline value may be set to a predetermined value. Next, the present system determines an OTO value (in time) for a next node upstream. This process continues by determining a subsequent OTO value for a next node upstream until the last upstream node directly connected to a respective host. Each node will have its own OTO, and this process will look to keep OTO as small as possible but also not cause false timeouts. Upstream node X may have multiple downstream nodes Y (e.g., $Y_0 \sim Y_n$) which have different number of fan-in and worst bus link. Upstream node X's OTO value needs to choose the maximum $OTO(Y_n)*\text{NFANIN}(Y_n)+$ LDELAY(X,Y$_n$) (expression also referred to as a corresponding downstream node timeout value herein) and add by its OMARGIN.

Figure 4A:
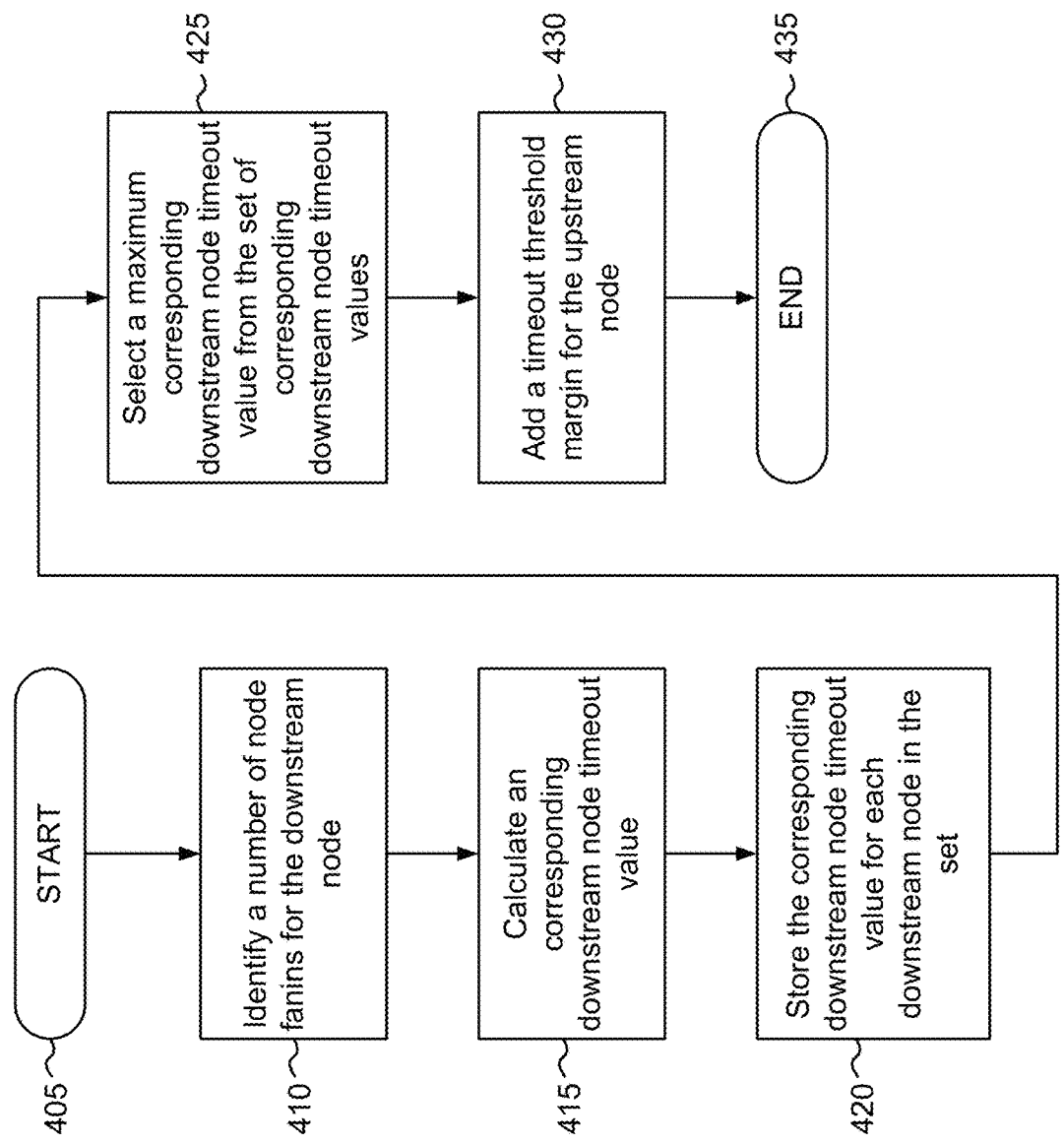
FIG. 4A illustrates an example process to create a set for corresponding downstream node timeout values to determine OTO for an upstream node, in accordance with one embodiment.

FIG. 4A illustrates an example process to create a set of corresponding downstream node timeout values to determine OTO for an upstream node, in accordance with one embodiment. The process starts at 405 and identifies, a number of node fanins for one or more downstream nodes coupled to a particular upstream node at 410. The present system identifies, for each downstream node, a corresponding downstream node timeout value of its own at 415. The corresponding downstream node timeout value is determined by multiplying an output timeout threshold time value (OTO) for the downstream node by the number of fanins for the downstream node and adding a delay between the particular upstream node and the downstream node. The process stores the corresponding downstream node timeout value for each downstream node in a set of corresponding downstream node timeout values at 420. The process selects a maximum corresponding downstream node timeout value from the set of corresponding downstream node timeout values at 425. The present system determines the OTO for the particular upstream node by adding a timeout threshold margin to the maximum corresponding downstream node timeout value for the upstream node at 430. The process may then end at 435.

Figure 4B:
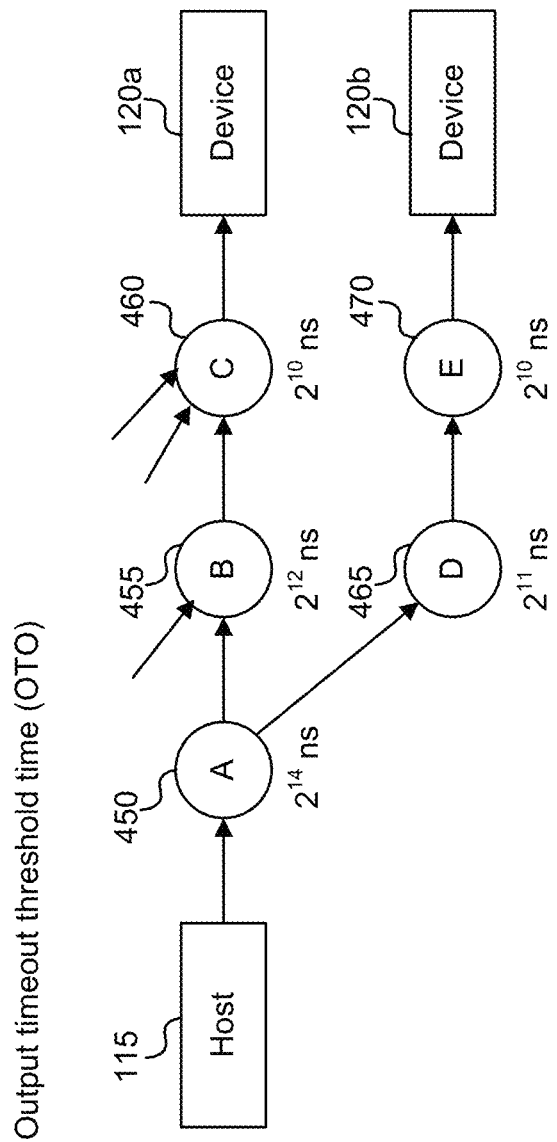
FIG. 4B illustrates an example of output timeout mechanism chain in accordance with one embodiment.

FIG. 4B illustrates an example of output timeout mechanism chain in accordance with one embodiment. Illustrated are a host 115 and a first device 120a with a first bus node A 450, a second bus node B 455 and a third bus node C 460 between them. Also shown are the host 115 and a second device 120b with the bus node A 450, a second bus node D 465, and a third bus node E 470 between the host 115 and the second device 120b. Bus node A is an upstream node that flows to downstream nodes B 455 and C 460. Bus node A 450 also is an upstream node that flows to downstream nodes D 465 and E 470. In this example, node B 455 and bus node D 465 may be intermediate nodes. Data packets are transmitted from the host 150 to the device 120a via the first bus node A 450, the second bus node B 455, and the third bus node C 460. Also, data packets are transmitted from the host 115 to the second device 120b via the first bus node A 450, the second bus node D 465, and the third bus node E 470. In this configuration, OTO is using a base of 2 to be hardware friendly, a clock period of 1 nanosecond (ns), a baseline OTO of 1024 ns for node C 460 and node E 470, which connects directly to the first device 120a and the second device 120b, respectively, a worst bus link delay of 100 ns, an OTO margin of 100 ns and a calculated OTO result that is rounded up to be in base of 2. It is noted that base of 2 as in this example allows for OTO values of 2, 4, 8, etc. When transferred to a binary number, they become 'b10, 'b100, 'b1000. Hence, the hardware can compare 1 bit to determine if OTO is reached.

By way of operational example, if bus node C 460 detects that an output port is not ready and goes to output timeout in 2^10 ns, then bus node A 450 and bus node B 455 can continue moving data packets and will not go to output timeout because they can wait 2^12 ns and 2^14 ns, respectively. If bus node E 470 detects that an output port is not ready and goes to output timeout in 2^10 ns, then bus node A 450 and bus node D 465 can continue moving data packets and will not go to output timeout because they can wait 2^14 ns and 2^11 ns, respectively. Referring to FIG. 4B, this is determined as follows:

node A 450 has 2 downstream nodes: node(B) 455 and node(D) 465, node B 455 has 2 upstream nodes: nodes (node(A) 450 and another incoming arrow) and 1 downstream node (C) 460, node C 460 has 3 upstream nodes: (node(B) 455 and two other incoming arrows) and 1 downstream node (device 120a)

node D 465 has 1 upstream node (A) 450 and 1 downstream node(E) 470, node E 470 has 1 upstream node (D) 465 and 1 downstream node (device 120b).

Based on the OTO equation noted previously, $$OTO(X) \max\{OTO(Y0)*\text{NFANIN}(Y0)+\text{LDELAY}(X, Y0), \ldots, OTO(Yn)*\text{NFANIN}(Yn)+\text{LDELAY}(X, Yn)\}+\text{OMARGIN}(X)$$

The OTO of node B 455 and node D 465 are determined as follows:

$$OTO(B)=OTO(C)*\text{NFANIN}(C)+\text{LDELAY}(B,C)+\text{OMARGIN}(B)=2^{10} \text{ ns}*3+100 \text{ ns}+100 \text{ ns}=3272 \text{ ns}$$

Then, round up OTO(B) to be in base of 2:

$$OTO(B)=2^{12} \text{ ns}$$

$$OTO(D)=OTO(E)*\text{NFANIN}(E)+\text{LDELAY } D,E)+\text{OMARGIN}(D)=2^{10} \text{ ns}*1+100 \text{ ns}+100 \text{ ns}=1224 \text{ ns}$$

Then, round up OTO(D) to be in base of 2:

$$OTO(D)=2^{11} \text{ ns}$$

The OTO of node A 450 is determined as follows:

$$OTO(A)=\max\{OTO(B)*\text{NFANIN}(B)+\text{LDELAY}(A,B), OTO(D)*\text{NFANIN}(D)+\text{LDELAY}(A,D)\}+\text{OMARGIN}(A)=\max\{2^{12} \text{ ns}*2+100 \text{ ns}, 2^{11} \text{ ns}*1+100 \text{ ns}\}+100 \text{ ns}=2^{12} \text{ ns}*2+100 \text{ ns}+100 \text{ ns}=8392 \text{ ns}$$

Then, round up OTO(A) to be in base of 2:

$$OTO(A)=2^{14} \text{ ns}$$

To avoid packets with frame errors and input timeout propagating to downstream, ITO may be designed so that the closer bus node locates to a source node, e.g., primary computer, the faster it goes to input timeout. Downstream ITO is calculated based on its upstream ITO to optimize threshold value.

Once a bus node goes to input timeout and injects dummy data, its downstream bus nodes can receive recovered packets without frame errors, and their iTimer can get reset before they go to input timeout. In this way, downstream bus nodes can resume to work without any problems, for example, receiving any packet with frame errors.

For a bus node having multiple input fan-in, the nodes may make use of a round-robin arbiter and will not switch to next input port until a full packet is received or an input timeout repairs the packet, so NFAININ is not needed in ITO calculation. Instead, data width needs to be taken into consideration. The ITO formula can be summarized as:

$$ITO(Y)=\max\{ITO(X_0)*DW(Y)/DW(X_0), \ldots, ITO(X_n)*DW(Y)/DW(X_n)\}+\text{IMARGIN}(Y)$$

where $X_n$ is an upstream node, Y is a downstream node, DW is a data width and IMARGIN is an input timeout threshold margin (e.g., clock asynchrony, etc.).

Here, ITO is the opposite of OTO. The process starts upstream closest to the primary 110 to then calculate the downstream ITO. A downstream node Y may have multiple upstream nodes $X_n$ which may have different data width. A downstream node Y ITO value is selected with the maximum $ITO(X_n)*DW(Y)/DW(X_n)$ (expression also referred to as an corresponding upstream node timeout value herein) and add by its IMARGIN to decrease false positives.

Figure 5A:
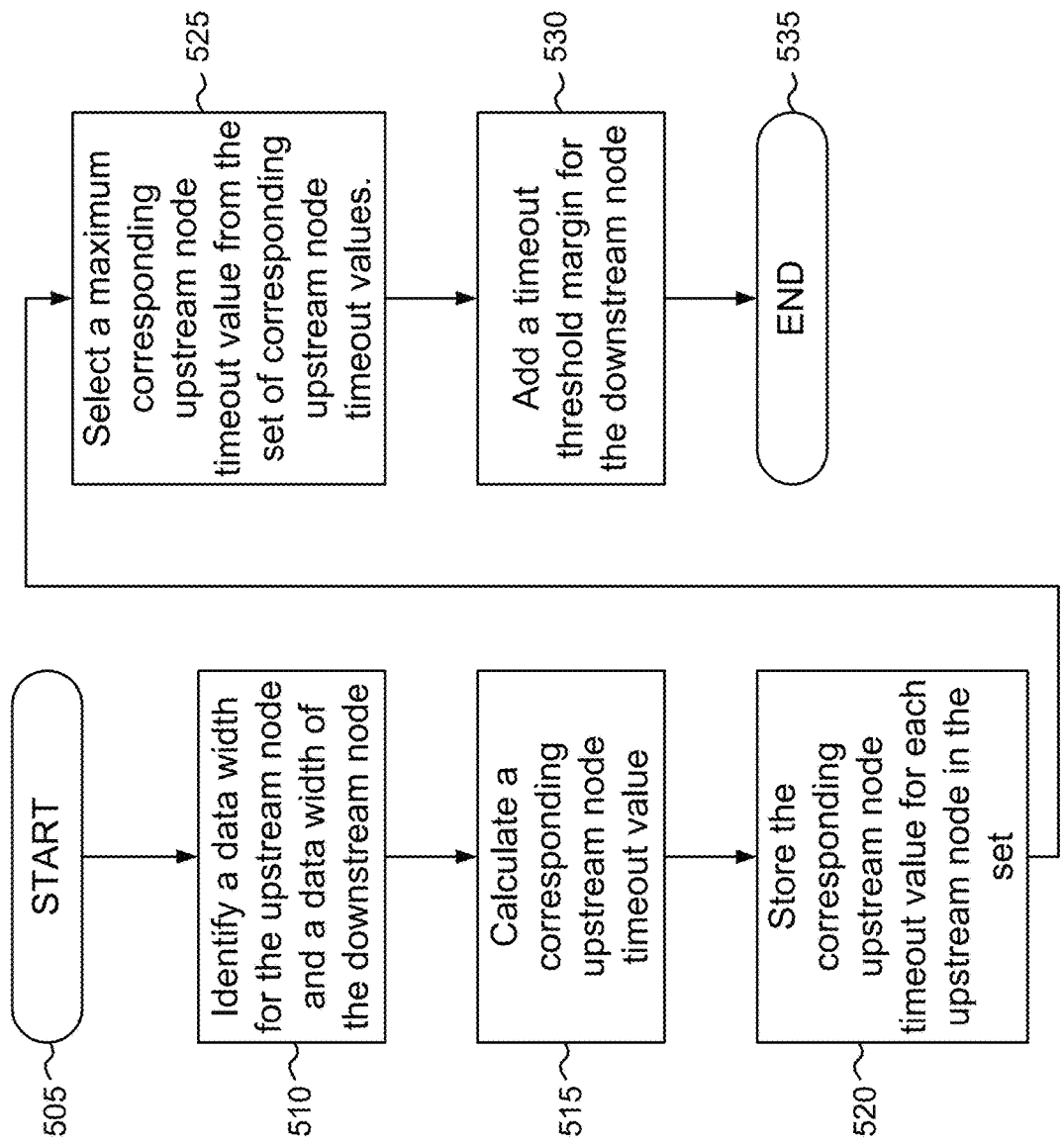
FIG. 5A illustrates an example process to create a set for corresponding upstream node timeout values to determine ITO for a downstream node, in accordance with one embodiment.

FIG. 5A illustrates, by way of example, a process to create a set for corresponding upstream node timeout values to determine ITO for a downstream node, in accordance with one embodiment. The process starts at 505 and identifies a data width for each upstream node and a data width of each downstream node at 510. The present system determines for each upstream node coupled to a particular downstream node, a corresponding upstream node timeout value at 515. The corresponding upstream node timeout value may be determined by calculation of a data width ratio that is dividing the data width of the particular downstream node by the data width of the upstream node, and multiplication of the data width ratio by an input timeout threshold value (ITO) for the upstream node. The process stores the corresponding upstream node timeout value for each upstream node coupled to the particular downstream node in a set of corresponding upstream node timeout values at 520. The present system selects a maximum corresponding upstream node timeout value from the set of corresponding upstream node timeout values at 525. The present system determines the ITO for the particular downstream node by adding a timeout threshold margin to the maximum corresponding upstream node timeout value for the downstream node at 530. The process may then end at 535.

Figure 5B:
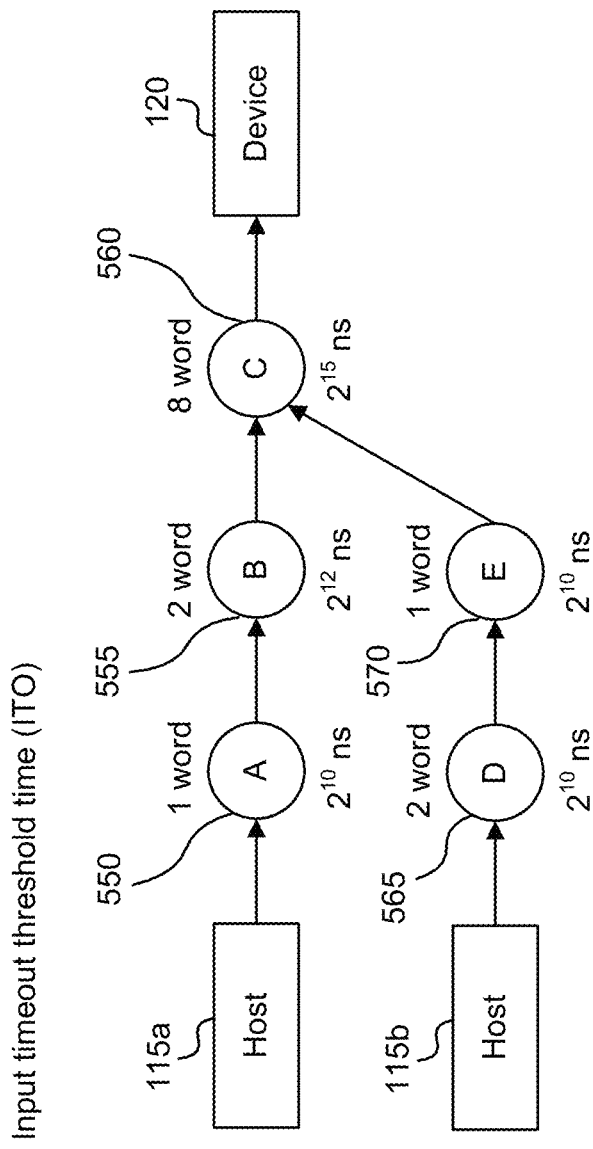
FIG. 5B illustrates an example of input timeout mechanism chain in accordance with one embodiment.

FIG. 5B illustrates an example of an input timeout mechanism chain in accordance with one embodiment. Illustrated are a first host 115a and a device 120 with a first node A 550, a second node B 555 and a third node C 560 between them. Also shown are a second host 115b and the device 120 with a first node D 565, a second node E 570 and a third node C 560 between the second host 115b and the device 120. Node A 550 flows to downstream nodes B 555 and C 560. Node D 565 flows to downstream nodes E 570 and C 560. Data packets are transmitted from the host 115 to the device 120 via the node A 550, node B 555 and node C 560. Also, data packets are transmitted from the host 115b to the device 120 via the node D 565, node E 570 and node C 560. In this example, node B 555 and node E 570 are intermediate nodes. In this configuration, ITO is using base of 2 to be hardware friendly, a clock period of 1 nanosecond (ns), a baseline ITO of 1024 ns for node A 550 and node D 565, which connects directly to the first host 115a and the second host 115b, data width A (DW(A)) of 1 word, DW(B) of 2 words, DW(C) of 8 words, DW(D) of 2 words, DW(E) of 1 word, an ITO margin of 100 ns and a calculated ITO result that is rounded up to be in base of 2.

If node A 550 receives a packet with frame errors, it goes to input timeout in 2^10 ns, then bus node B 555 and node C 560 can receive a frame-corrected packet and will not go to input timeout since they can wait 2^12 ns and 2^15 ns respectively. If node D 565 receives a packet with frame errors, it goes to input timeout in 2^10 ns, then bus node E 570 and node C 560 can receive a frame-corrected packet and will not go to input timeout since they can wait 2^10 ns and 2^15 ns respectively. Further, because a data width is in unit of a word (32-bits in a word), each node must count the word received in case node has to repair data with dummy data as well as how many cycles it will take to fill in the dummy data. In the ITO example diagram, this is determined as follows:

node A 550 has 1 downstream node(B) 555,
node B 555 has 1 upstream node (A) 550 and 1 downstream node(C) 560,
node C 560 has 2 upstream nodes (B) 555, node (E) 570, and 1 downstream node (device) 120.

Based on the ITO equation noted previously, $$ITO(Y) = \max\; ITO(X_0)*DW(Y)/DW(X_0), \ldots, ITO(X_n)*DW(Y)/DW(X_n) + IMARGIN(Y)$$

The ITO of node B 555 and node C 560 are determined as follows:

$$ITO(B) = ITO(A)*DW(B)/DW(A) + IMARGIN(B) = 2^{10} \text{ ns}*2/1 + 100 \text{ ns} = 2148 \text{ ns}$$

Then, round up $ITO(B)$ to be in base of 2: $ITO(B) = 2^{12}$ ns $$ITO(E) = ITO(D)*DW(E)/DW(D) + IMARGIN(E) = 2^{10} \text{ ns}*\tfrac{1}{2} + 100 \text{ ns} = 612 \text{ ns}$$

Then, round up $ITO(E)$ to be in base of 2: $ITO(E) = 2^{10}$ ns

The ITO of node C 560 is determined as follows:

$$ITO(C) = \max\{ITO(B)*DW(C)/DW(B), ITO(E)*DW(C)/DW(E)\} + IMARGIN(C) = \max\{2^{12} \text{ ns}*8/2, 2^{10} \text{ ns}*8/1\} + 100 \text{ ns} = 2^{12} \text{ ns}*8/2 + 100 \text{ ns} = 16484 \text{ ns}$$

Then, round up $ITO(C)$ to be in base of 2: $ITO(C) = 2^{15}$ ns

The disclosed configuration may operate in an emulation environment that includes an emulation system. FIG. 6 depicts a diagram of an example emulation environment 600. An emulation environment 600 may be configured to verify the functionality of the circuit design. The emulation environment 600 may include a host system 607 (e.g., a computer that is part of an EDA system) and an emulation system 602 (e.g., a set of programmable devices such as field programmable gate arrays (FPGAs) or processors). The host system generates data and information by using a compiler 610 to structure the emulation system to emulate a circuit design. A circuit design to be emulated is also referred to as a Design Under Test ('DUT') where data and information from the emulation are used to verify the functionality of the DUT.

The host system 607 may include one or more processors. In the embodiment where the host system includes multiple processors, the functions described herein as being performed by the host system can be distributed among the multiple processors. The host system 607 may include a compiler 610 to transform specifications written in a description language that represents a DUT and to produce data (e.g., binary data) and information that is used to structure the emulation system 602 to emulate the DUT. The compiler 610 can transform, change, restructure, add new functions to, and/or control the timing of the DUT.

The host system 607 and emulation system 602 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 602.11. The host system 607 and emulation system 602 can exchange data and information through a third device such as a network server.

The emulation system 602 includes multiple FPGAs (or other modules) such as FPGAs 604$_1$ and 604$_2$ as well as additional FPGAs to 604$_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 602 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs 604$_1$-604$_N$ may be placed onto one or more boards 612$_1$ and 612$_2$ as well as additional boards through 612$_M$. Multiple boards can be placed into an emulation unit 614$_1$. The boards within an emulation unit can be connected using the backplane of the emulation unit or any other types of connections. In addition, multiple emulation units (e.g., 614$_1$ and 614$_2$ through 614$_K$) can be connected to each other by cables or any other means to form a multi-emulation unit system.

For a DUT that is to be emulated, the host system 607 transmits one or more bit files to the emulation system 602. The bit files may specify a description of the DUT and may further specify partitions of the DUT created by the host system 607 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 607 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every 6 milliseconds where 6 is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 607 and/or the compiler 610 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 605 into gate level logic. For a DUT that is to be emulated, the design synthesizer sub-system receives a description of the DUT. If the description of the DUT is fully or partially in HDL (e.g., RTL or other level of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 7:
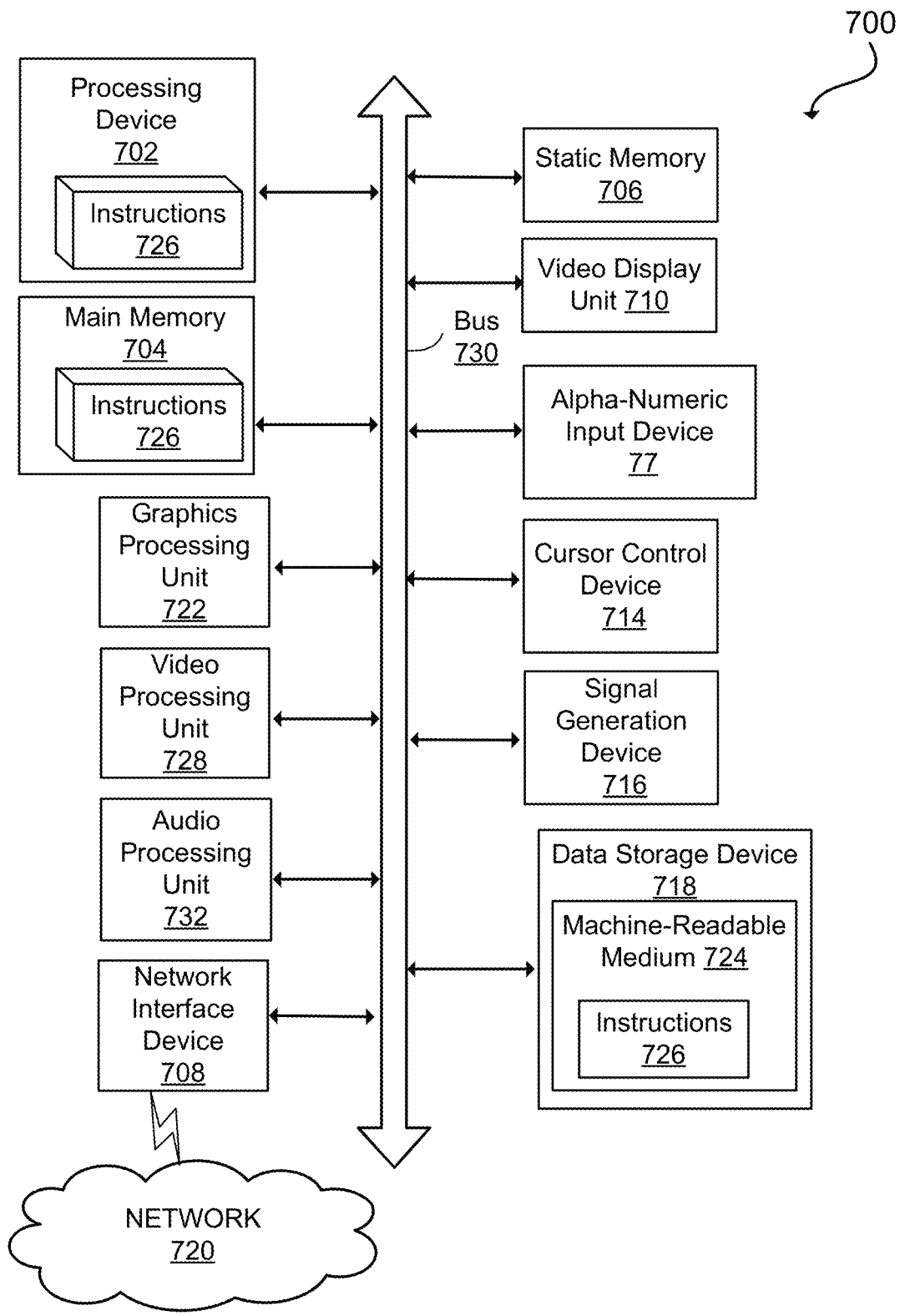
FIG. 7 depicts a diagram of an example computer system in which embodiments of the present disclosure may operate.

The emulation environment as well as a prototyping environment may operate with a computing system, e.g., a host system. FIG. 7 illustrates an example machine of a computing system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   determining whether a downstream node is ready to receive data from a buffer of an upstream node, wherein the upstream node is coupled to the downstream node within an emulation system;
   triggering a count as a timeout value for a counter in response to the downstream node not being ready to receive data;
   for each consecutive clock cycle before the count reaches the timeout value, determining whether the downstream node is ready to receive data;
   performing one of:
      incrementing the count for the counter responsive to determining that the downstream node is still not ready to receive data; or
      transmitting the data from the buffer to the downstream node and stopping the counter responsive to determining that the downstream node is ready to receive data; and
   issuing a signal to clear the buffer at the upstream node responsive to the count reaching the timeout value.

2. The method of claim 1, wherein the upstream node directly connects with a primary source and the downstream node connects with a device and an intermediate node between the upstream node and the downstream node, the intermediate node being downstream to the upstream node and being upstream to the downstream node.

3. The method of claim 1, further comprising:
   creating a set for corresponding upstream node timeout values;
   identifying, for each downstream node from the upstream node, a number of node fanins for the downstream node;
   calculating, for each downstream node, a corresponding upstream node timeout value;
   storing the corresponding upstream node timeout value for each downstream node in the set; and
   selecting a maximum corresponding upstream node timeout value from the set of corresponding upstream node timeout values.

4. The method of claim 3, wherein calculating the corresponding upstream node timeout value further comprises adding a timeout threshold margin for the upstream node.

5. The method of claim 4, wherein calculating the corresponding upstream node timeout value further comprises multiplying a timeout value for the downstream node by the number of node fanins for the downstream node.

6. The method of claim 5, further comprising adding a delay between the upstream node and the downstream node.

7. An emulation system comprising:
   a memory storing instructions; and
   a processor coupled with the memory and to execute the instructions, the instructions when executed cause the processor to:
      determine whether a downstream node is ready to receive data from a buffer of an upstream node, wherein the upstream node is coupled to the downstream node in the emulation system;
      trigger a count as a timeout value for a counter of the upstream node in response to the downstream node not being ready to receive data;
      for each consecutive clock cycle before the count reaches the timeout value, determine whether the downstream node is ready to receive data;
      performing one of:
         increment the count for the counter responsive to determining that the downstream node is still not ready to receive data; or
         transmit the data from the buffer to the downstream node and stop the counter responsive to determining that the downstream node is ready to receive data; and
      issue a signal to clear the buffer at the upstream node responsive to the count reaching the timeout value.

8. The emulation system of claim 7, wherein the upstream node directly connects with a host and the downstream node connects with a device and an intermediate node is between the upstream node and the downstream node, the intermediate node being downstream to the upstream node and being upstream to the downstream node.

9. The emulation system of claim 7, wherein the processor further executes the instructions to:
   identify, for one or more downstream nodes flowing from the upstream node, a number of node fanins for the one or more downstream nodes; and
   determine the timeout value for the upstream node based on a maximum timeout value corresponding to a downstream node of the one or more downstream nodes flowing from the upstream node.

10. The emulation system of claim 9, wherein the processor further executes the instructions to add a timeout threshold margin for the upstream node.

11. The emulation system of claim 10, wherein the processor execution of instructions to calculate the corresponding downstream node timeout value further comprises the processor execution of the instructions to multiply an output timeout threshold value for the downstream node by the number of node fanins for the downstream node.

12. The emulation system of claim 11, wherein the processor execution of instructions to calculate the corresponding downstream node timeout value further comprises the processor execution of the instructions to add a delay between the upstream node and the downstream node.

13. The emulation system of claim 8, wherein the emulation system comprises a node and is coupled with a second emulation system via a second bus.

14. A non-transitory storage medium comprising stored instructions, which when executed by at least one processor, cause the at least one processor to:
  receive at a downstream node a packet header from an upstream node, the packet header identifying a data size in a packet, wherein the downstream node is coupled to the upstream node in an emulation system;
  determine whether the data received is less than the data size specified by the packet header at the downstream node on a clock cycle;
  trigger a counter in response to the data received being less than the data size specified by the packet header at the downstream node on a clock cycle;
  for each consecutive clock cycle before a value of the counter reaches a timeout value,
    determine whether data received by the downstream node is less than the size specified by the packet header; and
    increment the value for the counter responsive to determining that data received at the downstream node is still less than the data size specified by the packet header;
  insert dummy data into the packet to fill a data width of the packet responsive to determining a value of the counter is at least the timeout value; and
  transmit the packet to the downstream node.

15. The non-transitory storage medium of claim 14, wherein the upstream node directly connects with a primary source and the downstream node connects with a device and an intermediate node is between the upstream node and the downstream node, the intermediate node being downstream to the upstream node and being upstream to the downstream node.

16. The non-transitory storage medium of claim 14, further comprising stored instructions that when executed causes the at least one processor to:
  identify, for each upstream node from the downstream node, a data width for the upstream node and a data width of the downstream node;
  calculate, for each upstream node, a set of corresponding downstream node timeout values; and
  select a maximum corresponding downstream node timeout value from the set of corresponding downstream node timeout values.

17. The non-transitory storage medium of claim 16, further comprising stored instructions that when executed causes the at least one processor to add a timeout threshold margin for the downstream node.

18. The non-transitory storage medium of claim 16, wherein the instructions to calculate the corresponding downstream node timeout value further comprises stored instructions that when executed causes the at least one processor to:
  calculate a data width ratio by dividing the data width of the downstream node by the data width of the upstream node;
  multiply the data width ratio by a timeout value for the upstream node; and
  store the corresponding downstream node timeout value for each upstream node in the set.

19. The non-transitory storage medium of claim 14, wherein the timeout value is an input timeout threshold time (ITO).

20. The non-transitory storage medium of claim 15, wherein the emulation system comprises a node and is coupled with a second emulation system via a second bus.

* * * * *